United States Patent [19]

Stillman, Jr.

[11] 4,205,426

[45] Jun. 3, 1980

[54] METHOD OF FABRICATING METAL LADDER

[75] Inventor: Harold W. Stillman, Jr., Clarendon Hills, Ill.

[73] Assignee: Sears, Roebuck and Co., Chicago, Ill.

[21] Appl. No.: 956,175

[22] Filed: Oct. 30, 1978

Related U.S. Application Data

[63] Continuation-in-part of Ser. No. 867,137, Jan. 5, 1978, abandoned.

[51] Int. Cl.$^2$ .......................... B21D 39/00; B23P 11/02

[52] U.S. Cl. .......................... 29/512; 29/523; 182/228; 403/274

[58] Field of Search .......................... 29/512, 522 R, 523; 182/207, 228; 403/274

[56] References Cited

U.S. PATENT DOCUMENTS

| | | | |
|---|---|---|---|
| 3,002,582 | 10/1961 | Marcelis | 29/523 UX |
| 3,119,435 | 1/1964 | Greenman | 29/523 X |
| 3,279,051 | 10/1966 | Minshall | 29/512 |
| 3,280,454 | 10/1966 | Rich et al. | 29/523 X |
| 3,283,402 | 11/1966 | Larson | 29/512 |
| 3,349,870 | 10/1967 | Lieblein | 29/523 UX |
| 3,388,454 | 6/1968 | Willis | 29/523 |
| 3,491,853 | 1/1970 | Stillman, Jr. | 182/207 |
| 3,856,113 | 12/1974 | Engvall et al. | 182/228 X |

*Primary Examiner*—Charlie T. Moon

*Attorney, Agent, or Firm*—Arnstein, Gluck, Weitzenfeld & Minow

[57] ABSTRACT

A metal ladder is fabricated from a pair of spaced rails in which the rails have web portions which are provided at spaced intervals with inwardly directed embossments. Each of these embossments has an opening into which one end of a tubular rung is inserted and swaged to the rail. The embossments act as ribs to carry the load toward the flanges constituting the stiffer portions of the rail thereby increasing the strength and effectively reducing the web flexure and angle changes between the rungs and the rails, due to sideward forces in ladder use. By reason of the built in stiffness web thickness may be reduced resulting in savings in materials. Additionally, intermediate these embossments, just described, the web portion of each rail is formed with one or more outwardly directed embossments.

3 Claims, 9 Drawing Figures

METHOD OF FABRICATING METAL LADDER

BACKGROUND OF THE INVENTION

This is a continuation-in-part application of parent application S.N. 867,137 filed January 5, 1978, now abandoned, for a Metal Ladder.

My invention relates to improvements in metal ladders and to a method of fabricating the same.

Typical metal extension ladders are formed of extruded side rails which have I-beam or channel configurations and webs to which the rungs are attached. Such webs are flat planes and usually are maintained at minimum thickness consistent with practical extruding and acceptable engineering practices to prevent web crippling tendencies in bending. The most common method of attaching a rung to the rail web is by swaging an end of the rung to the flat web of the rail. In a modified method employed in some ladders, a soft collar of metal is swaged around the rung and to the web. The resulting ladder assembly laterally is similar to a Vierendeel truss which is a low efficiency truss depending on the rigidity of the joints for strength.

In U.S. Pat. No. 3,388,454 to Willis, there is disclosed a method of fabricating metal ladders in which the rung is connected to the web in a single operation. The patent teaches a method of first forming a hole in flat web of the rail and inserting the rung in the hole. Then both the inner and outer beads on the rung, as well as the embossing surrounding the rung are formed in a single operation. Obviously, the hole provided must have the same configuration as the perimeter of the rung. However, when the web is deformed in the embossing operation the metal will be pulled away from the hole, changing the configuration of the hole. This is likely to result in a loose connection between the rung and the rail after final swaging.

The swaging of the rung and embossing of the web in a single operation, as above described requires that the rails be processed while in a tempered state because subsequent tempering of a complete ladder, after fabrication, is not economical or space efficient. If a tempered rail is used in accordance with the method of the patent the low elongation characteristics of the aluminum will likely distort the rail. Further, the method as taught in the patent does not take into account the inherent increase in web thickness to provide greater strength as the length of the ladder is increased. It should be apparent that webs having a thickness greater than the minimum thickness associated with usual extruded sections normally will not be capable of being embossed.

SUMMARY OF THE INVENTION

The present invention overcomes the deficiencies of prior art structures and methods by securing each end of a rung in an embossed area formed in the web of the rail through a series of separate steps. The hole which receives the rung is formed in the embossment subsequent to the embossing operations so as to avoid deformation of the rung hole. Because the center portion of the web has localized flexing when sideward loads are applied due to parallelogramming action, the embossed web portion acts as a beam to carry the load toward the stiffer flange areas. Tests have shown, in ladders constructed in accordance with my invention, that side sway can be reduced by at least fifty percent under that experienced with conventional type ladders. Also, it has been found that the strength of the rung is considerably improved because the rung in bending acts more like a fixed beam.

In normal bending a rail may fail by buckling between the rungs. Because of the increased strength of the joints between the rungs and the webs, it is desirable to improve the strength of the rails to obtain an overall improved ladder and this may be effected by embossing the webs in the areas intermediate the rungs to increase bending strength. Such intermediate embossing are directed outwardly, opposite from the embossings carrying the rungs which are directed inwardly.

A significant saving in material is effected in the construction of a ladder in accordance with my invention. Due to the embossing of each rail, the web is moved inwardly a short distance approximately ¼ inch. As a result, each rung which is disposed between aligned embossments may be reduced approximately ½ inch in length for the same usable size ladder. In addition, web thickness may be reduced without reduction in rail strength or stiffness.

BRIEF DESCRIPTION OF A PREFERRED EMBODIMENT

Figure 1:
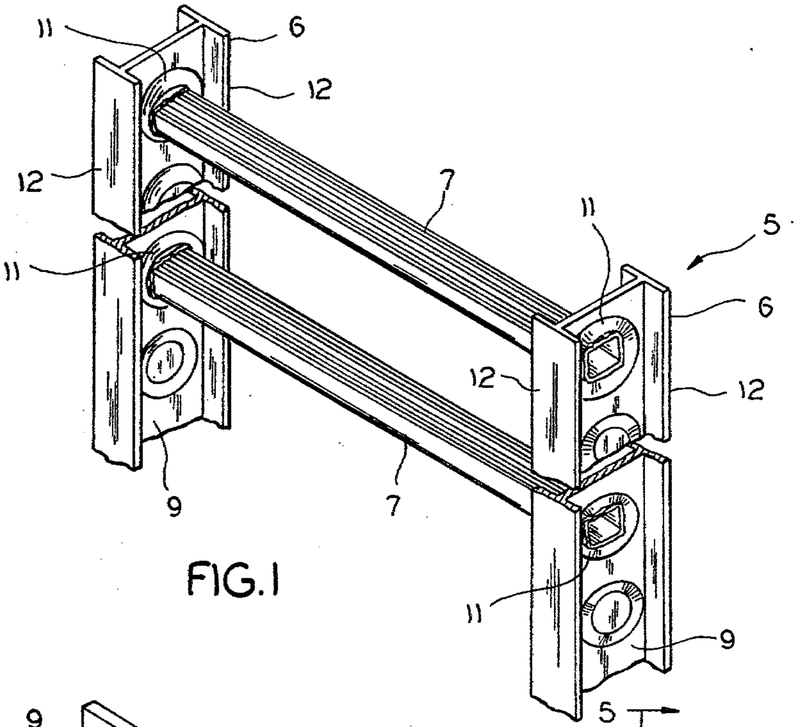
FIG. 1 is a fragmentary perspective view of a portion of a ladder, in accordance with my invention.
Figure 2:
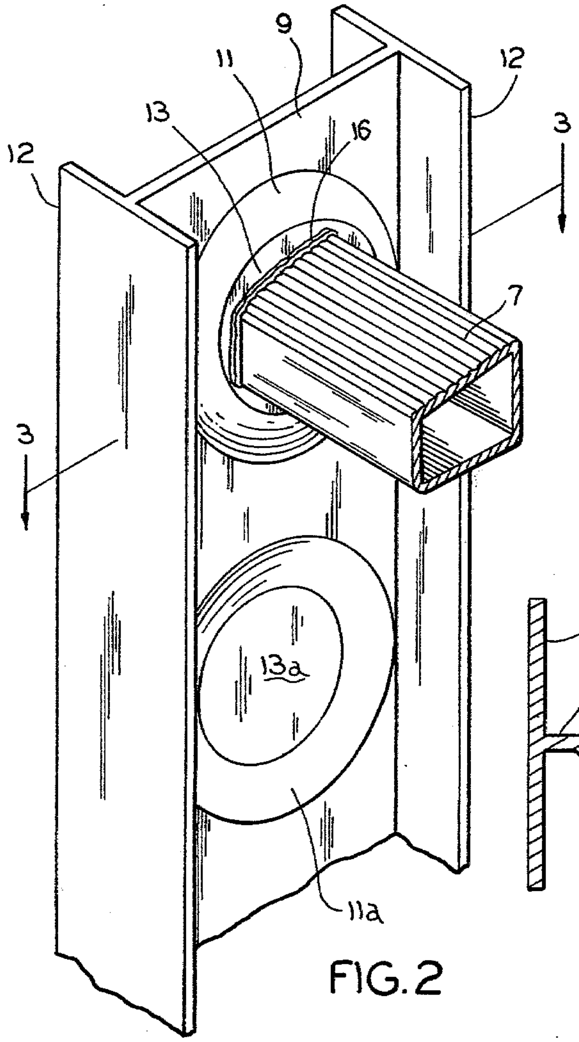
FIG. 2 is a fragmentary perspective view, on an enlarged scale, of a step or rung in assembled relation with a stile or rail.
Figure 4:
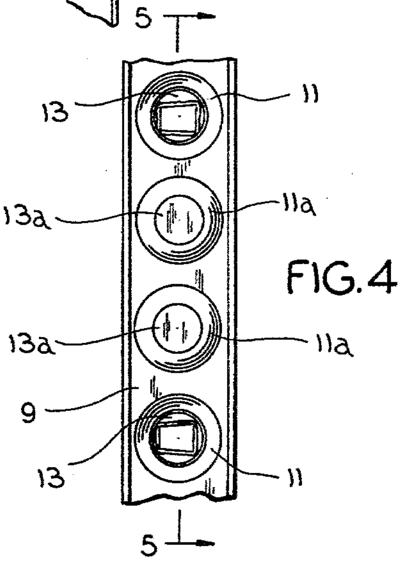
FIG. 4 is a fragmentary elevational view of a ladder rail, in accordance with my invention.

The ladder 5, according to my invention, comprises a pair of rails or stiles 6 arranged in parallel relation and connected by a plurality of transverse steps or rungs 7. The rails 6 are structurally identical and are formed of extruded aluminum or any other suitable metal. While the rail 6 is illustrated as having an I-beam cross section, it will be understood that the invention is applicable to a web of conventional channel or sigma cross sectional shape, the latter being shown in my U.S. Pat. No. 3,491,853.

At spaced intervals, corresponding to the conventional distance between the steps or rungs, the web 9, as will be hereinafter described, is stamped or pressed out of its plane to form embossments 11 providing a rib effect between the flanges 12. These embossments 11 are disposed on the inner side of the web 9. Intermediate each pair of embossments 11 and web 9 are two embossments or ribs 11*a* which are disposed on the outer side of the web 9. Thus, each of the embossments or ribs 11 which carry the rungs 7 is inwardly directed on the rail, while each of the intermediate embossments or ribs 11*a* is outwardly directed. Each of the embossments 11, 11*a* is located medially of the flanges 12. In a specific example considered, in a rail where the width of the web 9 between the flanges 12 was 2⅝ ins. the depth of the embossment 11, 11*a* was approximately $\frac{3}{8}$ ins. The embossments 11, 11*a* may have a frustum or concavo-convex formation. However, in each case the deepest or central portion 13 of the embossment is flat and is disposed in a plane parallel to the plane of the web 9. Preferably, each embossment 11, 11*a* should be of such size in relation to the width of the web 9 that its periphery is as close as practicable to the flanges 12 consistent with approved fabrication techniques. The central flat portion 13 of each embossment 11, is provided with an opening 14 in the form of a trapezoid to receive the rung 7, hereinafter to be described. It is noted that the embossments 11*a* are not provided with openings in the corresponding flat portions 13*a*.

Because of improved rigidity and strength characteristics which result from the present invention, I have found that a rail having a web thickness of 0.044 in. which includes the embossments 11, 11*a* has the same comparative strength as a rail having a web thickness of 0.064 in. without the embossments. Clearly, this results in a substantial saving in material in addition to other benefits. For example, the rail depth between flanges 12 may be increased without an increase in web thickness. The increased rail depth provides an increase in rail stiffness which results in a reduction in deflection under load. Thus, a stiffer and lighter ladder is easier to climb and safer to handle. Also, it is noted that by reason of the savings in material substantial saving in the use of valuable energy required to produce aluminum is effected.

The rungs 7 are of conventional construction preferably, being formed of extruded aluminum tubing. In this instance, the cross section configuration of the rung is trapezoidal, although it will be understood that it may have any suitable shape.

Figure 3:
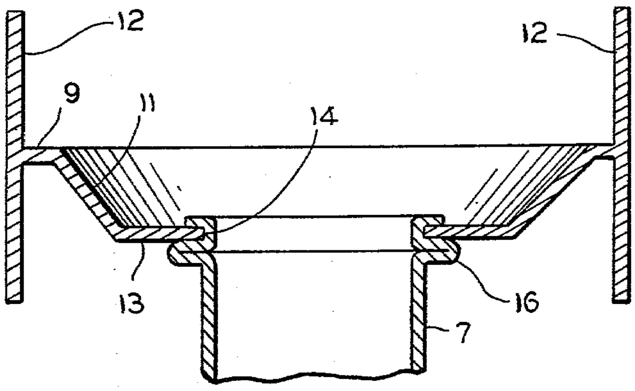
FIG. 3 is a cross sectional view, on an enlarged scale, taken substantially on line 3—3 of FIG. 2.
Figure 5:
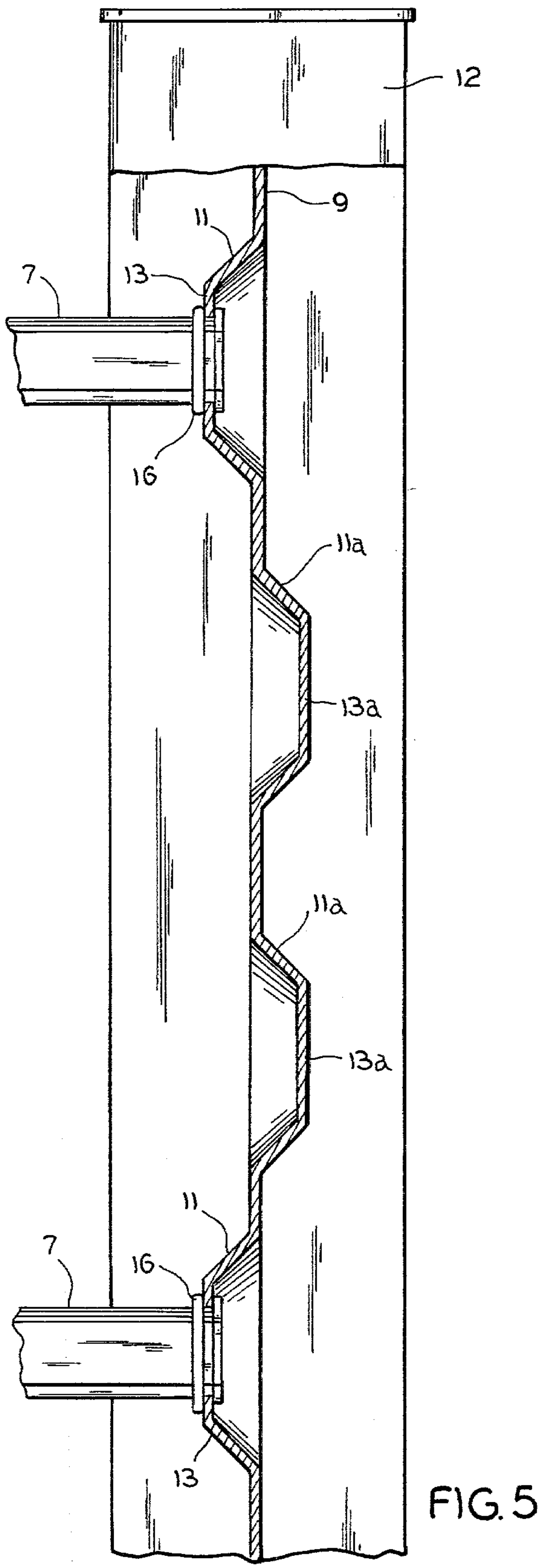
FIG. 5 is a longitudinal vertical cross sectional view, on an enlarged scale, taken substantially on line 5—5 of FIG. 4.
Figure 6:
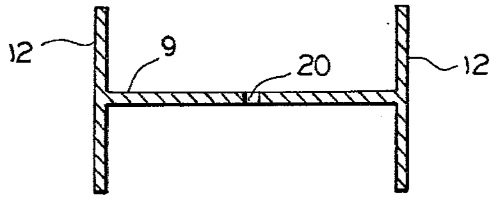
FIGS. 6 through 9 are transverse cross-sectional views of a rail showing the progressive steps employed in constructing a ladder, in accordance with my invention.
Figure 7:
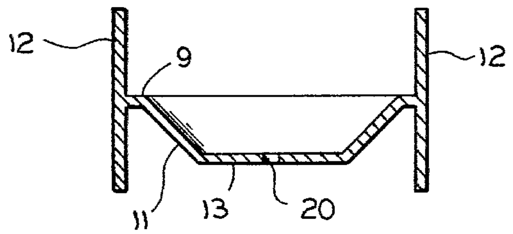
Figure 8:
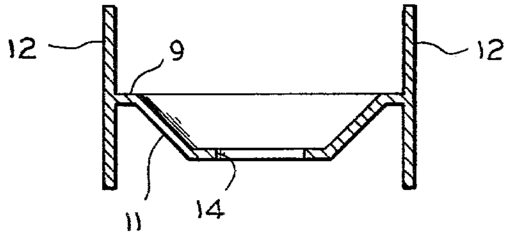

FIG. 6 through 9 show the sequence of steps in the construction of a ladder in accordance with my invention. As seen in FIG. 6, the web 9 of each rail 6 is drilled or punched to provide a series of longitudinally spaced pilot holes 20. These holes are located medially of the flanges 12 and at spaced points, each corresponding to the location of a rung 7. The web portion 9 surrounding each hole is displaced by conventional stamping means to one side of the web corresponding to the inner side of the rail, to form an embossment 11, shaped substantially as illustrated in FIGS. 3, 5 and 7. The embossment includes a flat surface 13 substantially concentric with the pilot hole 20 and parallel to the plane of the web 9. In the next step, as shown in FIG. 8, the flat portion 13 is stamped to provide an opening 14 corresponding to the configuration of the rung 7, preferably in the form of a trapezoid, although, it will be understood that the opening 14 may have any suitable configuration to accommodate a particular rung. In any event, the opening 14 is suitably shaped to snugly receive the rung 7.

Figure 9:
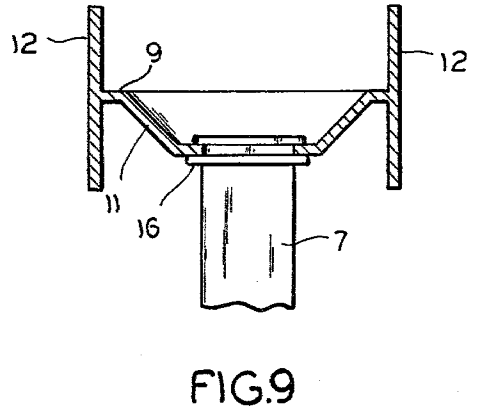

Advantageously before the rungs 7 are assembled with the rail 6 the embossments 11*a* are stamped in the web 9. Two of such embossments 11*a* which are directed oppositely from the embossments 11 are provided between each pair of adjacent rungs 7 and may be formed by utilizing the same tools as employed for the embossments 11. Prior to assembly of the rung 7 to the rail, each rung 7 is first swaged at each end to provide a double walled shoulder 16 spaced from the end edge of the rung, as shown in FIG. 3. This shoulder 16 is intended to abut the inner face of the flat portion 13 and to overlap the marginal edge surrounding the opening 14. The end portion of the rung 7 is then passed through opening 14 and in the final operation is swaged to abut and overlap the marginal edge surrounding the opening 14 on the outer face of the flat portion 13 of the embossment, as seen in FIGS. 3 and 9.

I have found that in a ladder constructed in accordance with my invention the rigidity of the joint between the rung 7 and rail 6 is very substantially improved. Normally, the central portion of the web 9 due to parallelogramming action is subjected to the greatest flexure when sideward stresses are applied. In the present invention it is believed that each embossed web portion 11, 11*a* acts as a beam to carry the load towards the more rigid areas adjacent the flanges 12 of the I-beam and also the rung 7 acts in the nature of a fixed end beam in bending.

The use of my invention will result in a ladder of improved structural strength over conventional ladder constructions having corresponding dimensions. Accordingly, if it is desired to equally match the structural characteristics of a conventional ladder with a ladder embodying my invention, such a ladder may be constructed of rail members having cross sections of reduced thicknesses thereby providing a ladder lighter in weight and utilizing less material than a corresponding conventional ladder.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In a method of fabricating a metallic ladder type structure by interconnection of rails to the ends of tubular rungs, the steps of providing a pilot aperture in the web of a rail, displacing a portion of said web concentric with said pilot aperture to form an embossment having a flat central portion generally parallel to the plane of the web, providing a tubular rung, displacing an end portion of said rung to form an upset bead exteriorly of said rung, stamping a rung receiving aperture in the flat central portion of said embossment with said rung receiving aperture conforming closely to the configuration of said rung, inserting said end of said rung in said rung receiving aperture and displacing the terminal end portion of said rung into compressive engagement with said flat central portion of said embossment.

2. A method of connecting tubular rungs and rail webs in the fabrication of metal ladder type structures comprising the steps of displacing an end portion of a tubular rung to form an upset bead exteriorly of said rung, providing a pilot aperture in the web of a rail, displacing a portion of said web surrounding said aperture to form an embossment having a flat central portion generally parallel to the plane of the web, stamping a rung receiving aperture in said flat central portion of said embossment, said aperture having a shape conforming closely to the configuration of said rung, locating the end of said rung in the rung receiving aperture and deforming the terminal end portion of said rung into compressive engagement with said flat central portion of said embossment in immediate surrounding relation to said rung.

3. The method as defined in claim 1 including the steps of displacing portions of said web adjacent each rung to form embossments directed oppositely from the direction of the embossment carrying the rung.

* * * * *